United States Patent [19]
Waldecker

[11] 3,722,623
[45] Mar. 27, 1973

[54] PRELIMINARY LUBRICATION DEVICE

[75] Inventor: Donald E. Waldecker, Fairfax, Va.

[73] Assignee: RAM Enterprises, Incorporated, Falls Church, Va.

[22] Filed: May 25, 1971

[21] Appl. No.: 146,640

[52] U.S. Cl. ................184/6.3, 123/196 S, 251/76
[51] Int. Cl. ...................................................F01m 7/00
[58] Field of Search ..........184/6.3, 6.23; 123/196 S; 251/76, 129, 141; 137/179

[56]      References Cited

UNITED STATES PATENTS

| 2,755,787 | 7/1956 | Butler et al. | 184/6.3 |
| 2,755,888 | 7/1956 | Cunningham | 184/6.3 |
| 1,931,060 | 10/1933 | Cochrane | 184/6.3 |
| 3,422,807 | 1/1969 | Waldecker | 184/6.3 |
| 2,324,642 | 7/1943 | Peterson | 251/76 |
| 3,556,070 | 12/1971 | Holcomb | 123/196 S |
| 2,033,992 | 3/1936 | Moller | 184/6.3 |
| 3,583,527 | 6/1971 | Raichel | 184/6.3 |

FOREIGN PATENTS OR APPLICATIONS

| 921,129 | 3/1963 | Great Britain | 251/139 |

*Primary Examiner*—Manuel A. Antonakas
*Attorney*—Glenn E. Wise

[57]      ABSTRACT

A device for providing adequate lubrication to lubricant pump-including, pressure-lubricated equipment during start-up of the equipment.

11 Claims, 3 Drawing Figures

INVENTOR.
Donald E. Waldecker
BY Glenn E. Wise
AGENT 3,722,623

PRELIMINARY LUBRICATION DEVICE

OBJECTS OF THE INVENTION

This invention relates to a preliminary lubrication device for pressure lubricated equipment such as internal combustion engines and machine tools and, more particularly, is directed to such a device having novel valve control and air purging features.

This invention is an improvement on the lubrication device that forms the subject matter of my U.S. Pat. No. 3,422,807. Specifically, the instant invention is capable of performing most of the functions set forth relative to my earlier device, in U.S. Pat. No. 3,422,807, with fewer parts, particularly fewer moving parts, and simpler circuitry.

Some other patents which relate to lubrication devices of the general type disclosed herein are U.S. Pat. Nos. 2,273,888, 2,736,307, and 2,747,564.

The construction and operation of my preliminary lubrication device will be set forth hereinbelow, for purposes of illustration, in conjunction with an internal combustion engine. However, it is to be understood that this device is also capable of being used with other pressure lubricated mechanisms.

An internal combustion engine normally has incorporated therewith an engine driven oil pump which is designed to supply lubricating oil under pressure to the engine so that a film of lubricant is maintained between relatively moving bearing and sealing surfaces to substantially decrease friction and lessen direct metal-to-metal wear. Once the engine is started and lubricating oil pressure has been achieved, and is maintained by the engine driven oil pump, a flow of lubricant is carried to each surface which requires it.

After starting a cold internal combustion engine, however, several seconds normally elapse before oil pressure from the engine driven oil pump is sufficient to properly lubricate the parts which require lubrication. This lag is particularly critical in low temperature operation because the lack of a lubricant permits a dry metal-to-metal frictional contact resulting in excessive wear. My invention is directed to a device for reducing friction at engine start-up.

An object of my invention is to provide a preliminary lubricating device for an internal combustion engine which will provide lubrication to the engine before the engine driven oil pump achieves lubricating pressure.

Another object of my invention is to provide a preliminary lubrication device constructed in such fashion that the major components thereof are easily disassembled whereby maintenance problems are rendered relatively simple.

Other objects of my invention will become apparent upon consideration of the following description in conjunction with the drawing submitted herewith, in which.

Figure 1:
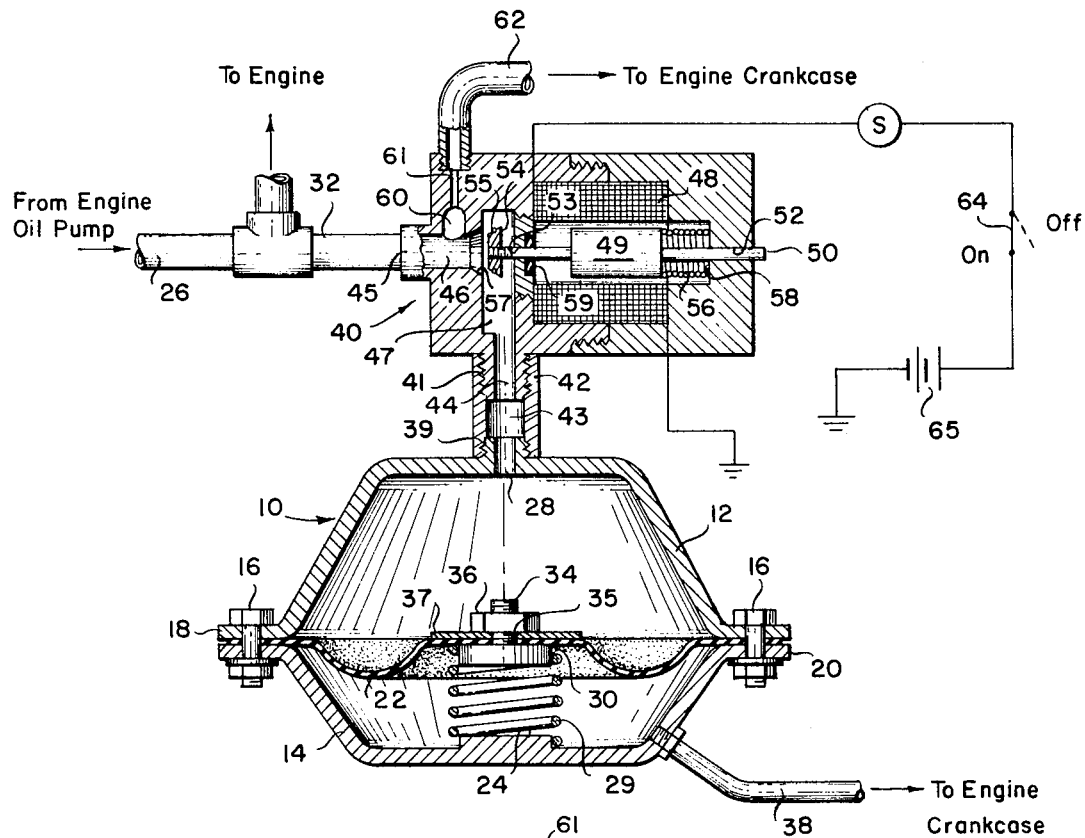
FIG. 1 is a somewhat schematic vertical sectional view of my preliminary lubrication device.

In accordance with the invention, a chamber, generally designated by the numeral 10, is defined by a pair of cup-like casing halves 12 and 14. Each half is adapted to be secured to the other as for example by a plurality of bolts 16 which extend through holes in annular flanges 18 and 20. Bolts 16 may also be utilized to mount my preliminary lubrication device on a fixed supporting bracket (now shown) adjacent an engine with which the device is used.

A flexible diaphragm 22 is secured between the flanges 18 and 20 and hermetically seals the casings 12 and 14 together at this juncture. That portion of chamber 10 formed between the diaphragm 22 and upper casing 12 is adapted to receive and, at the desired time, discharge lubricating oil to relatively moving parts, such as cylinders, pistons and bearings, of an internal combustion engine. This operation will be more fully discussed hereinafter.

An existing lubricating oil discharge line, indicated by numeral 26, leads from the engine driven lubricating oil pump (not shown) to bearings, cylinders and other parts requiring lubrication. A main oil inlet and discharge opening 28 is provided in casing half 12 to permit oil under pressure to enter into chamber 10 and then later to be discharged into tubing 32 which communicates with inlet line 26 of the engine's regular lubricating system.

In those engines where no line such as 26 is present or readily accessible external of the engine, my device may be connected into the engine's regular lubrication system by connecting line 32 directly to the engine's pressurized oil gallery (downstream of the engine driven oil pump). This latter method of connection can be accomplished, for example, by removing the engine's oil pressure sensing means, replacing same with a T-tubing fitting, and then coupling line 32 to one exposed branch of the T and replacing the oil pressure sensing means in the remaining exposed branch of the T.

Upstanding from the central upper portion of casing half 14 is an integral cylindrical boss 24 for locating and maintaining in its proper position the lower end of a coil spring 29 which is coaxial with and surrounds and engages this boss. The upper end of spring 29 is located and maintained in its proper position by surrounding and engaging the cylindrical head 30 of a bolt 34. The free ends of spring 29 may be welded to boss 24 and head 30, respectively, to assure that this spring will remain in its desired position. The purpose of spring 29 will be set forth hereinafter.

Bolt 34 passes through an aperture 35 in diaphragm 22, and is maintained in its proper location in my device by means of a nut 36. As seen, nut 36 tightly urges a back-up washer 37 against the top side of diaphragm 22 and the top of head 30 against the bottom of diaphragm 22 in such fashion that no oil can leak through aperture 35.

In the event that diaphragm 22 should rupture after extended use or for other reasons, I provide a tubular conduit 38 which communicates the interior of lower casing half 14 with the engine's crankcase or oil sump and which would thus eventually recycle any oil passing through a ruptured diaphragm 22 to the engine's oil pump. The portion of chamber 10 below diaphragm 22 is normally filled with air and allows diaphragm 22 to flex downwardly against spring 29. It is desirable to form conduit 38 out of transparent material, or to provide a sight glass section (not shown) in this conduit if it is made from opaque material so that rupture of diaphragm 22 will be evident to an observer because of oil flow or smears in the transparent conduit or sight glass section.

Opening 28, it will be noted, forms the bore of an externally threaded nipple portion 39 which is integral with and extends upwardly from the top central portion of casing half 12. Above chamber 10 is located a control assembly designated generally as 40. Control assembly 40 has an integral externally threaded nipple portion 41 depending from its underside, and assembly 40 is connected to chamber 10 by means of an internally threaded coupling 42 which mates with portions 39 and 41. Coupling 42 has an interior bore 43, and nipple portion 41 has an internal bore 44.

Control assembly 40 further includes an integral nipple portion 45, in the bore 46 of which is fastened a line 32; a valve chamber 47; a toroidal solenoid coil 48; and a reciprocating solenoid armature 49 which is rigidly mounted on a combination armature guide and valve stem 50. Stem 50 is guided to and fro, as coil 48 is energized and de-energized, relative to apertures 52 and 53 in which its opposite ends are located.

Rigidly attached to the left end of stem 50 is a valve head 54 which carries a seal 55 thereon. Valve head 54, in conjunction with seal 55 is adapted to move to the left and seal against a valve seat 57 under the bias of a spring 56 when the solenoid coil 48 is deactivated, if the engine oil pump is not operating. Spring 56, which is shown fully compressed in the drawing is co-axial with the right-hand end of stem 50, and has it opposite ends bearing, respectively against the right-hand end of armature 49 and an interior wall portion 58 in assembly 40. Numeral 59 designates a seal for preventing oil from entering the solenoid area of assembly 40.

Communicating with bore 46 immediately upstream from seat 57 is an air purging chamber 60 which, in turn, communicates with a small diameter outlet aperture 61. Aperture 61 communicates with a tubular purge line 62 which discharges any fluid flowing therein into the engine's crankcase or oil pump. If desired from the standpoint of economy, line 62 and conduit 38 can be merged somewhere between assembly 40 and the crankcase and proceed as a single tube from the point of their merger on to the crankcase or sump since both of elements 38 and 62 empty thereinto.

The circuit that controls the activation of solenoid coil 48 and, thus, armature 49, includes two switches 64 and S, and suitable leads, as shown schematically, connecting these switches and the armature coil 48 to a battery 65 and to ground. In the case where my preliminary lubrication device is provided as an attachment to a vehicle-installed internal combustion engine, then battery 65 can be the usual vehicle-installed battery, and switch 64 may be either the usual vehicle-installed combination starter and ignition switch, or a separate switch. If switch 64 is a separate switch, not associated with the vehicle-installed ignition switch, it is then possible for a user to actuate my device and provide a "slug" of oil to those engine parts which require lubrication before engine cranking during engine start-up. When switch 64 is the vehicle-installed starter and ignition switch, it will be evident that the "slug" of lubricating oil provided by my device will be delivered to those engine parts which require lubrication substantially at the same time that engine-cranking begins. Switch S can be either a conventional manifold pressure-operated, or oil pressure-operated switch, as will be apparent from a consideration of the operation of my device which follows. In either case switch S is of a type which is closed when the engine is not running and remains closed until either oil pressure or manifold pressure (depending upon whether switch S is a oil pressure or manifold pressure-operated switch) achieves a predetermined value.

OPERATION

Let it be assumed for purposes of illustration, that my device is installed as an attachment to a vehicle-installed internal combustion engine which has incorporated therewith the usual engine-operated oil pump. Let it be further assumed that the engine, as well as its controlling electrical circuits are de-activated; that switch 64 is the engine's starter and ignition switch; and that the electrical controlling circuit of my device is also deactivated.

Based upon the assumptions just set forth, spring 56 would be urging armature 49, and thus valve 54 to the left in the drawing whereby valve 54 and its associated seal 55 would be seated against seat 57 thereby sealing off communication between bore 46 and valve chamber 47. Let it be further assumed that the portion of chamber 10 above diaphragm 22, the opening 28, bores 43 and 44, and chamber 47 are filled with lubricating oil under pressure (caused by spring 29 attempting to urge diaphragm 22 upwardly) as a result of previous operation of the engine and my device installed thereon.

Now, when starter and ignition switch 64 is moved from its "off" to its "on" position to initiate starter operation and engine cranking, solenoid coil 48 (since S is closed as noted hereinabove) will simultaneously be activated thereby moving armature 49 and the elements attached thereto, including valve 54, to the right in FIG. 1 of the drawing, as shown. As valve 54 moves off of seat 57, a sufficient quantity of the oil previously trapped in 47, 44, 43, 28 and above diaphragm 22 in chamber 10 (hereinafter referred to as a "slug") will be forced, because of the expansion of spring 29 pushing diaphragm 22 upwardly, through bore 46 into tubing 32 and thence to the engine to temporarily lubricate the various parts of the engine which require lubrication. The volume of oil discharged by diaphragm 22 during engine start-up takes place before the engine-driven oil pump is producing at a pressure sufficient to properly lubricate the aforesaid various engine parts. Therefore, the "slug" of oil provided by my device at this critical phase of engine operation greatly increases the life of vital engine parts, such as the engine's piston rings.

It should be noted that a small portion of the "slug" of oil just-discussed will bleed off through chamber 60 and aperture 61 and will return to the crankcase via line 62 as diaphragm ascends during the phase of the operation just discussed. However, the cross-section of aperture 61 is sized much smaller than the interior cross-section of bore 46 and tubing 32 so that only a very minor portion of the pre-lubricating "slug" of oil will find its way into line 62 at this time. This minor amount of oil passing to line 62, however, will serve to carry along with it any air accumulated in purge chamber 60, to be discussed further hereinafter, whereby the portion of the "slug" of oil which is delivered to the engine for lubrication purposes is substantially free of air contamination.

Also during the phase of operation just-described another minor amount of the "slug" of oil will find its way into inlet line 26 to back-fill and pressurize line 26 back to the engine-operated oil pump which, at this juncture is just beginning to produce a pressure output. The "slug" of oil delivered by the ascent of diaphragm 22 is of such volume, however, that the loss of the minor portions to lines 22 and 26, just discussed, still leaves an ample portion of the "slug" to pass to the engine for lubricating purposes.

As the engine-driven oil pump comes up to its normal operating pressure, at about the time diaphragm 22 ascends to its maximum height, pre-lubrication is no longer required since pressurized oil from the engine-operated oil pump now proceeds through line 26 and to the engine to lubricate the parts thereof, which require lubrication, in a conventional manner.

Once the engine is running and the engine-driven oil pump in providing lubricating oil to the engine at proper pressure the engine-driven oil pump, in addition to providing oil to lubricate engine parts, will also cause pressurized oil to flow through 32, 46, 47, 44 and 28 and into the part of chamber 12 above diaphragm 22. Since spring 29 is chosen so that its biasing effect against the diaphragm 22 is less than the biasing effect of the pressurized oil from the engine-driven oil pump, when the engine-driven oil pump is operating normally, the pressurized oil mentioned in the previous sentence causes diaphragm 22 to be depressed against the bias of spring 29 whereby my device is effectively "re-charged" with another "slug" of oil.

Assuming that switch S is an oil pressure operated switch set to open in response to normal engine-driven oil pump pressure attainment, e.g., in line 26, switch S will open and deactivate coil 48 once normal engine-driven oil pump pressure is attained with the engine running. However, the re-charging of my device, as described in the preceeding paragraph will occur whether or not solenoid coil 48 remains activated, for the following reason. Spring 56 is chosen so that the biasing effect thereof, which is always attempting to close valve 54, is less than, and preferably about one-half of the biasing effect, of the pressurized oil being supplied toward valve 54 from the engine-driven oil pump when such pump is operating at its normal pressure. Thus, valve 54 remains off of its seat 57 when the engine-driven oil pump is operating normally whether coil 48 is energized or de-energized.

In the event that the engine-driven oil pump should momentarily malfunction to the extent that its output pressure dropped to the point that valve 54 and switch S again closed, then coil 48 would again be activated whereby valve 54 would be opened to allow another "slug" of oil to be discharged from my device to the engine for lubricating purposes.

In the event that it is desired to utilize a manifold pressure-operated switch for switch S, rather than an oil pressure-operated switch as just described, then de-activation of switch S and thereby coil 48 would take place once the engine is operating in such manner that the pressure required to operate switch S is available in the manifold (preferably the intake manifold, but conceivably the exhaust manifold) in which switch S is installed. In the event that switch S is a manifold pressure-operated switch, rather than an oil pressure-operated switch, then the comments in the preceeding paragraph concerning reactivation of coil 48 due to the malfunction of the engine-driven oil pump do not apply. However, it is conceivable that switch S could reclose to activate coil 48 even with a manifold pressure-operated switch being used as switch S if, for example, misfiring of the engine causes manifold pressure to change sufficiently.

Proper operation of the solenoid consisting of coil 48 and armature 49 can be visually confirmed at engine-start-up since the right-hand end of stem 50 will protrude slightly beyond the wall of assembly 40 through which it passes if coil 48 of the solenoid activates properly. If stem 50 does not so protrude then the solenoid assembly is malfunctioning.

Air purge chamber 60, previously mentioned, is of importance in providing a means whereby air entrained in the lubricating oil can be vented to atmosphere by way of aperture 61, purge line 62, the engine's crankcase or sump, the usual engine oil filler tube and oil filler tube breather cap. At all times when the engine driven oil pump is operating properly there will be a small quantity of oil, and any air or air bubbles carried thereby, passing through chamber 60 and out 61 and 62 to the crankcase or sump, as just mentioned. Chamber 60, it will be noted rises upwardly from bore 46 in order to extract as much air as possible, since air is lighter than oil, from the oil passing through bore 46.

If the engine should "die" or be "killed" with starter and ignition switch 64 still on and my device "charged;" a "slug" of lubricating oil will be sent to the engine by my device whereby it will be available for engine restart. Such action takes place because, when the engine stops, switch S will close, and with starter and ignition switch 64 already closed valve 54 will be unseated because of the immediate activation of coil 48.

If the engine is stopped by the turning off of starter and ignition switch 64 then spring 56 will immediately urge valve 54 unto its seat 57 thereby trapping a "slug" of pressurized oil between valve 54 and diaphragm 22, which oil is available for release, as described hereinabove, when the ignition and starter switch 64 is next actuated in starting the engine. If switch 64 is a switch other than the starter and ignition switch the operation of my device will be the same as described above as regards the engine being "killed" or "dieing" if separate switch 64 is left in the "on" position. If a separate switch 64 is turned "off" subsequent to engine start-up and the "recharging" of my device, then separate switch 64 must again be turned to its "on" position during re-start after the engine is "killed" or "dies" if the "slug" of lubricant from my device is to be made available to the engine during such re-start.

Figure 2:
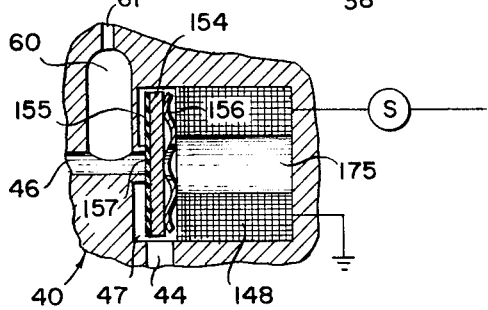
FIG. 2 is a vertical sectional view of another type of solenoid-operated valve that can be substituted for the valve shown in FIG. 1; and, FIG. 3 is a vertical sectional view of yet another type of solenoid-operated valve that can be substituted for the valves shown in FIGS. 1 and 2.

Turning now to FIG. 2 of the drawings, there is shown a solenoid-actuated valve assembly that can be substituted for the solenoid-actuated valve assembly of FIG. 1. In FIG. 2, 148 denotes an actuating coil; 154 denotes a combined valve head and armature; 155 denotes a rubber, or the like, sealing layer laminated to valve head and armature 154; and 156 denotes a sinuous spring for urging valve head 154 to the left, as seen in FIG. 2, on to a valve seat denoted 157.

My device, when utilizing the valve assembly of FIG. 2, operates in a manner fully equivalent to the valve assembly of FIG. 1 except that no seal, such as seal 59 of FIG. 1, is required in the FIG. 2 valve assembly since oil, in this latter assembly is allowed to circulate freely into and out of the hollow center 175 of coil 148, and the valve assembly of FIG. 2 has no means, such as the right-hand end of stem 50 of FIG. 1, for indicating the proper activation of coil 148.

Spring 156, as was noted above relative to spring 56, is chosen so that the biasing effect thereof, which is always attempting to close the valve head and armature 154, is less than, and preferably about one-half of the biasing effect of the pressurized oil being supplied toward the combined valve head and armature 154 from the engine-driven oil pump when such pump is operating at its normal pressure. Thus the valve head and armature 154 remains off of its seat 157 when the engine-driven oil pump is operating normally whether coil 148 is energized or de-energized. Energization of coil 148 in the FIG. 2 assembly, of course, acts to move the combined valve head and armature 154 to the right, as viewed in FIG. 2, in the same manner that energization of coil 48 in FIG. 1, acts to move valve head 54 to the right. In FIG. 2, the valve assembly is shown as it would appear when the engine with which it is associated is not running and coil 148 is deactivated.

Figure 3:
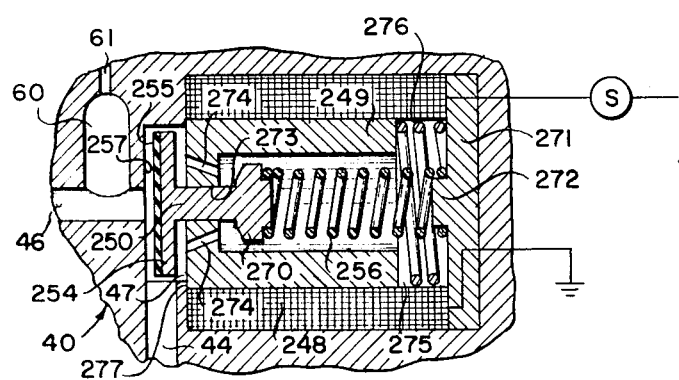

Turning now to FIG. 3 of the drawings, there is shown a solenoid-actuated valve assembly that can be substituted for the solenoid-actuated valve assemblies of either FIGS. 1 or 2. In FIG. 3, 248 denotes an actuating coil; 254 denotes a valve head mounted on a valve stem 250. Valve head 254 has laminated thereto a rubber, or the like, sealing layer 255 which aids valve head 254 in sealing tightly against valve seat 257 which forms one wall of valve chamber 47.

Valve stem 250, at its right-hand end, it will be noted, carries an enlargement 270 which provides locator and seating means for one end of a spring 256. The other end of spring 256 is seated on a fixed plate 271 and is retained in its operative position by means of a boss 272 on plate 271 which it surrounds.

Valve stem 250 is slidably located in an aperture 273 in an armature 249. Apertures 274 in armature 249 allow oil to pass into and out of the hollow center of armature 249 and into the hollow center 275 of coil 248. The number 276 denotes a spring which constantly urges armature 249 toward stop shoulder 277.

My device, when utilizing the valve assembly of FIG. 3, operates substantially in the same manner as when the valve assembly of FIG. 2 is utilized. However, armature 249 when caused to move to the right by energization of coil 248, is able to gain some momentum before the wall thereof through which apertures 274 pass strikes the left-hand side of enlargement 270, as viewed in FIG. 3. Thus armature 249 acts as a hammer in unseating valve 254 from seat 257 thereby overcoming the possibility that valve 254 will "stick" on its seat and fail to open when desired. Enlargement 270, it will be noted, is sized so that it cannot ever completely close apertures 274.

The valve assembly in FIG. 3 is shown as it would appear when the coil 248 is de-energized and when the engine's oil pump is delivering oil at normal operating pressure.

The valve assembly of FIG. 3 is similar to the valve assembly of FIG. 2 in requiring no seal of the type seen at 59 in FIG. 1. Also the valve assembly of FIG. 3 is similar to the valve assembly of FIG. 2 in not incorporating an indicating means of the type provided by the right-hand end of stem 50 of the valve assembly in FIG. 1.

No matter which of the valve assemblies disclosed is utilized in my device, when the engine with which my device is associated is operating normally, there will be a small flow of oil (and any air entrapped therein) not only out of aperture 61, but also into and out of the portion of chamber 10 above diaphragm 22. This latter flow minimizes the possibility of acidification or sludge build-up in the oil in chamber 10.

Spring 276 in FIG. 3 is chosen so as to have a bias which is only a small fraction of the force exerted upon armature 249 by the energization of coil 248. Spring 256 is chosen to exhibit a bias conforming to the same considerations as set forth relative to springs 56 and 156 hereinabove.

It should be noted that during normal engine operation each of the described valves 54, 154 and 254 will tend to oscillate to some extent after the space in casing half 12 above diaphragm 22 has been substantially refilled with a new "slug" of oil, subsequent to discharge of a pre-lubricating "slug." This is because of pressure build-up in 12, 28, 43, 44 and 47, and because of changes in the engine oil pump's operating pressure, due, for example, to changes in engine speed. However, such oscillations in no way alter the basic operation of my device as described hereinabove.

Having now set forth my invention, what I claim and desire to secure by letters patent is:

1. A preliminary lubrication device for use with a machine which has incorporated therewith lubricating means including an oil sump and a pump for circulating oil from said sump to said pump and then through fluid conducting means to relatively movable parts of said machine that require lubrication comprising: control means including first passageway-providing means connected in fluid communicating relationship with said fluid conducting means and second passageway-providing means connected in fluid communicating relationship with oil storage means, said oil storage means comprising a substantially closed chamber divided by a diaphragm having opposite sides with one side in fluid communicating relationship with said second passageway-providing means, said chamber on said one side of said diaphragm adapted to be filled with oil under pressure to move said diaphragm and stress resilient means, third passageway-providing means in said control means communicating said first passageway-providing means with said second passageway-providing means, fourth passageway-providing means continuously communicating said first passageway-providing means with said sump for purging air from said oil, and valve means incorporated in said control means for allowing or preventing communication between said first and third passageway-providing means, said valve including a valve head continuously biased in a closing direction by spring means, and adapted to be moved in an opening direction either by electrical means or by pressurized oil from said pump.

2. The device of claim 1 wherein the biasing effect of said spring means on said valve head is less than the force produced on said valve head by said pressurized oil when said pump is producing pressurized oil at its normal operating pressure.

3. The device of claim 2, said electrical means including a coil located on the same side of said valve means as said spring means, said valve means comprising a stationary valve seat and a combined plate-like armature and valve head which is adapted to be moved away from said valve seat upon energization of said coil, said spring means being located between said armature and said coil.

4. The device of claim 2, said electrical means including a coil located on the same side of said valve means as said spring means, said valve means comprising a stationary valve seat and a reciprocable valve head adapted to be engaged with and disengaged from said valve seat, said valve head having opposite sides, the side of said valve head that engages said valve seat carrying a sealing layer, a stem having one end attached to and extending from the opposite side of said valve head, said stem being located coaxial with said coil and having another end which carries an enlarged portion, said spring means being located within said coil and coaxial with said coil and said stem and having one end engaging said enlarged portion, an armature slidably mounted on said stem, second spring means for normally biasing said armature away from said enlarged portion, said coil when energized causing said armature to slide along said stem and impact said enlarged portion whereby said valve head is moved away from said valve seat.

5. The device of claim 1 said fourth passageway-providing means including an air purging chamber opening into said first passageway-providing means and extending upwardly therefrom and an aperture opening into said chamber and extending upwardly therefrom, said aperture being substantially smaller in cross-section than the internal cross-section of said first passageway-providing means and said chamber.

6. The device of claim 5, said machine comprising an internal combustion engine and said electrical means comprising a solenoid.

7. The device of claim 6, said internal combustion engine including a starting and ignition circuit having a combined starting and ignition switch means therein, said switch means when turned to its on position being adapted to activate said solenoid to urge said valve head to open said valve means against the bias of said spring means.

8. The device of claim 6, said internal combustion engine including a starting and ignition circuit having a combined starting and ignition switch, and a separate switching circuit for activating said solenoid.

9. The device of claim 7, including means, in addition to said switch means for deactivating said solenoid.

10. The device of claim 8 including means in addition to said separate switching circuit for deactivating said solenoid.

11. The device of claim 6 wherein said solenoid is located on the same side of said valve means as said spring means.

* * * * *